United States Patent
Brown et al.

(10) Patent No.: US 10,168,916 B2
(45) Date of Patent: Jan. 1, 2019

(54) SYSTEM, METHOD AND A NON-TRANSITORY COMPUTER READABLE MEDIUM FOR REDUCTION OF CONSUMPTION OF STORAGE SYSTEM RESOURCES

(71) Applicant: Infinidat LTD., Herzliya (IL)

(72) Inventors: Eran Brown, Givatayim (IL); Jacob Broido, Tel-Aviv (IL)

(73) Assignee: INFINIDAT LTD., Herzliya (IL)

( * ) Notice: Subject to any disclaimer, the term of this patent is extended or adjusted under 35 U.S.C. 154(b) by 327 days.

(21) Appl. No.: 14/530,774

(22) Filed: Nov. 2, 2014

(65) Prior Publication Data
US 2016/0124660 A1  May 5, 2016

(51) Int. Cl.
*G06F 3/06* (2006.01)
*G06F 12/0868* (2016.01)
*G06F 17/30* (2006.01)
*G06F 11/14* (2006.01)

(52) U.S. Cl.
CPC .......... *G06F 3/0614* (2013.01); *G06F 3/0643* (2013.01); *G06F 3/0659* (2013.01); *G06F 3/0671* (2013.01); *G06F 11/1456* (2013.01); *G06F 11/1458* (2013.01); *G06F 11/1471* (2013.01); *G06F 12/0868* (2013.01); *G06F 17/30* (2013.01); *G06F 2212/463* (2013.01)

(58) Field of Classification Search
CPC .... G06F 3/0614; G06F 3/0634; G06F 3/0671; G06F 12/0623; G06F 12/0873

USPC ........ 711/154, 162; 707/624, 634, 639, 640, 707/820; 712/225, 248
See application file for complete search history.

(56) References Cited

U.S. PATENT DOCUMENTS

| | | | | |
|---|---|---|---|---|
| 8,332,354 | B1* | 12/2012 | Chatterjee | G06F 11/1461 707/624 |
| 8,364,652 | B2* | 1/2013 | Vijayan | G06F 3/0652 707/692 |
| 8,600,935 | B1* | 12/2013 | Dantkale | G06F 17/30073 707/624 |
| 9,235,535 | B1* | 1/2016 | Shim | G06F 12/16 |
| 2005/0097290 | A1* | 5/2005 | Cochran | G06F 3/0613 711/165 |
| 2005/0216788 | A1* | 9/2005 | Mani-Meitav | G06F 11/1456 714/6.32 |
| 2007/0288526 | A1* | 12/2007 | Mankad | G06F 11/1662 |
| 2009/0055399 | A1* | 2/2009 | Lu | G06F 17/30132 |
| 2009/0177857 | A1* | 7/2009 | Butterworth | G06F 11/1435 711/162 |

(Continued)

*Primary Examiner* — Larry T Mackall
(74) *Attorney, Agent, or Firm* — Reches Patents

(57) ABSTRACT

A method that may include receiving, by a storage system, a write request for storing in the storage system multiple input data units that are related to a certain file; comparing, by the storage system, the multiple input data units to stored data units of the certain file to find matching and non-matching input data units; wherein each matching input data unit equals a corresponding stored data unit and each non-matching input data unit differs from a corresponding stored data unit; preventing a storage of each matching input data unit; storing each non-matching input data unit; and updating at least one storage system management data structure to reflect a reception of non-matching input data units while not reflecting a reception of matching input data units.

19 Claims, 4 Drawing Sheets

(56) References Cited

U.S. PATENT DOCUMENTS

| | | | |
|---|---|---|---|
| 2010/0235332 A1* | 9/2010 | Haustein | G06F 17/30315 707/692 |
| 2011/0191555 A1* | 8/2011 | Narayanan | G06F 12/00 711/162 |
| 2012/0084268 A1* | 4/2012 | Vijayan | G06F 3/0652 707/692 |
| 2012/0167080 A1* | 6/2012 | Vilayannur | G06F 3/0608 718/1 |
| 2012/0254110 A1* | 10/2012 | Takemoto | G06F 17/30212 707/624 |
| 2013/0110779 A1* | 5/2013 | Taylor | G06F 17/30221 707/624 |
| 2013/0339302 A1* | 12/2013 | Zhang | G06F 17/30581 707/649 |
| 2014/0047190 A1* | 2/2014 | Dawkins | G06F 12/0813 711/136 |
| 2015/0309740 A1* | 10/2015 | Amit | G06F 12/0871 711/129 |

* cited by examiner

SYSTEM, METHOD AND A NON-TRANSITORY COMPUTER READABLE MEDIUM FOR REDUCTION OF CONSUMPTION OF STORAGE SYSTEM RESOURCES

BACKGROUND

When an application opens a file stored on a NAS storage for modification, it is the responsibility of the application to calculate the changes made to the file and send only the changes to the storage. However, some applications may send to the storage the entire file, as if the entire file was changed, even if only a small portion was changed.

Storage systems consume vast amount of storage and computing resources for tracking changes. For example, a journal file that records transactions will consume increased storage resources for recording write requests of larger size, since the data to be written is temporarily stored in the journal file.

An asynchronous remote mirroring will waste computing resources and probably storage resources for calculating differences occurred since a previous replication cycle in a volume or file system to be replicated, when the amount of differences is prominent.

Snapshots will consume extra storage resources when there are more differences occurred since a previous snapshot has been taken.

Other processes that will suffer from extensive updates include CDP (Continuous Data Protection), that automatically saves a copy of every change made to data and incremental processes, such as incremental backup and incremental virus scans.

Thus, if an application rewrites unchanged data, not only unnecessary rewrites of the unchanged data are performed in vain, but it also affects performance of other processes that are difference-driven

SUMMARY

According to an embodiment of the invention a method may be provided and may include receiving, by a storage system, a write request for storing in the storage system multiple input data units that are related to a certain file; comparing, by the storage system, the multiple input data units to stored data units of the certain file to find matching and non-matching input data units; wherein each matching input data unit equals a corresponding stored data unit and each non-matching input data unit differs from a corresponding stored data unit; preventing a storage of each matching input data unit; storing each non-matching input data unit; and updating at least one storage system management data structure to reflect a reception of non-matching input data units while not reflecting a reception of matching input data units.

The method may include determining whether an aggregate size of the multiple input data units exceeds a certain size threshold; and wherein the comparing is executed only when the aggregate size of the multiple data units exceeds the certain size threshold.

The certain size threshold may be determined based upon an aggregate size of the stored data units of the certain file.

The certain size threshold may exceed a half of an aggregate size of the stored data units of the certain file.

The certain file may belong to a certain file system; wherein the method may include monitoring write requests related to the certain file system.

The method may include determining a certain file system attribute that is indicative of requests to store matching input data units.

The method may include sending an alert indicative of undesired requests related to the certain file system to store matching input data units.

The method may include allocating storage system resources to the certain file system in response to a value of the certain file system attribute.

The method may include allocating storage system resources to different file systems in response to values of file system attributes associated with the different file systems; wherein each file system attribute is indicative of requests that are related to a file system to store matching input data units.

The comparing may include caching the stored data file units in a cache memory of the storage system.

The method may include allocating cache memory resources to different file systems in response to the values of the file system attributes.

The method may include prioritizing caching of stored data units related to a first file system over caching of stored data units related to a second file system when the first file system is associated with more requests to store matching input data units than the second file system.

The prioritizing may include preferring a deletion, from the cache, of stored data units that are associated with the second file system.

The at least one storage system management data structure may include a journal file.

The at least one storage system management data structure may include a snapshot management data structure.

The at least one storage system management data structure may include data changes data structure indicative of changes in data stored in the storage system.

According to an embodiment of the invention a method may be provided and may include receiving, by a storage system, a write request for storing in the storage system multiple input data units that are related to a certain file that is stored in the storage system; comparing, by the storage system and only if an aggregate size of the multiple input data units exceeds a majority of a size of the certain file, the multiple input data units to stored data units of the certain file to find matching and non-matching input data units; wherein each matching input data unit equals a corresponding stored data unit and each non-matching input data unit differs from a corresponding stored data unit; preventing a storage of each matching input data; and storing each non-matching input data unit.

The method may include updating at least one storage system management data structure to reflect a reception of non-matching input data units while not reflecting a reception of matching input data units.

According to an embodiment of the invention there may be provided a non-transitory computer readable medium that stores instructions to be executed by a computerized system for receiving, by a storage system, a write request for storing in the storage system multiple input data units that are related to a certain file; comparing, by the storage system, the multiple input data units to stored data units of the certain file to find matching and non-matching input data units; wherein each matching input data unit equals a corresponding stored data unit and each non-matching input data unit differs from a corresponding stored data unit; preventing a storage of each matching input data unit; storing each non-matching input data unit; and updating at least one storage system management data structure to reflect a reception of non-matching input data units while not reflecting a reception of matching input data units.

According to an embodiment of the invention there may be provided a non-transitory computer readable medium that stores instructions to be executed by a computerized system for receiving, by a storage system, a write request for storing in the storage system multiple input data units that are related to a certain file that is stored in the storage system; comparing, by the storage system and only if an aggregate size of the multiple input data units exceeds a majority of a size of the certain file, the multiple input data units to stored data units of the certain file to find matching and non-matching input data units; wherein each matching input data unit equals a corresponding stored data unit and each non-matching input data unit differs from a corresponding stored data unit; preventing a storage of each matching input data; and storing each non-matching input data unit.

According to an embodiment of the invention there may be provided a storage system that may include a cache memory and a control module, wherein the storage system is configured to store at least one storage system management data structure; wherein the control module is configured to receive a write request for storing in the storage system multiple input data units that are related to a certain file; compare the multiple input data units to stored data units of the certain file to find matching and non-matching input data units; wherein each matching input data unit equals a corresponding stored data unit and each non-matching input data unit differs from a corresponding stored data unit; prevent a storage of each matching input data unit; instruct a storage in the storage system of each non-matching input data unit; and update the at least one storage system management data structure to reflect a reception of non-matching input data units while not reflecting a reception of matching input data units.

According to an embodiment of the invention there may be provided a storage system that may include a storage system that may include a cache memory and a control module, wherein the control module is configured to receive a write request for storing in the storage system multiple input data units that are related to a certain file that is stored in the storage system; compare, only if an aggregate size of the multiple input data units exceeds a majority of a size of the certain file, the multiple input data units to stored data units of the certain file to find matching and non-matching input data units; wherein each matching input data unit equals a corresponding stored data unit and each non-matching input data unit differs from a corresponding stored data unit; prevent a storage of each matching input data; and instruct a storing of each non-matching input data unit in the storage system.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
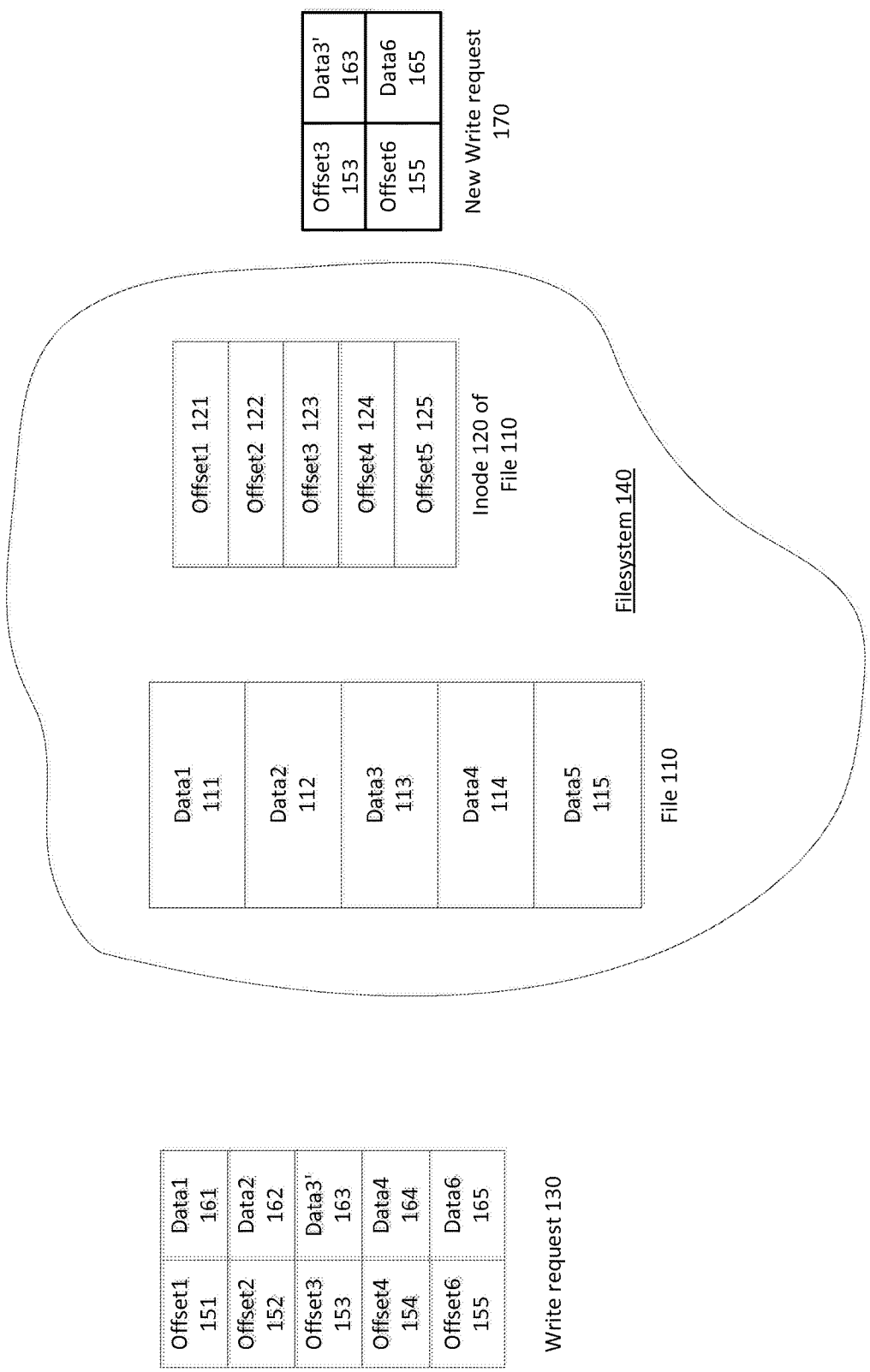
FIG. 1 illustrates a write request, a new write request, a stored file and an inode according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

The present invention provides a storage system and method that detects write requests that include overwriting of the previously stored data with unchanged data and avoids such overwriting.

When the storage system receives a write request addressed to a certain file within a certain file system, the storage system detects whether the write is addressed to already written offsets within the file (rather than e.g., appending data at the end of the file or at other offsets that were never written to) and whether the size of the data to be written is substantially large comparing to the current size of the file, e.g., whether the size to be written is above 90% of the original file's size. If the size of the data to be written is similar to the current file's size, there is an elevated chance that the data to be written is not entirely new. In this case, the certain file is read into the cache memory and the new data directed to offsets to be written is compared to the stored data in these file's offsets.

The aggregate size of input data units included in the write request should exceed a size threshold. The size threshold may be determined per file, per file system, per multiple file systems and the like. It may exceed half the size of a file or any other portion (ranging between 50 and 99%).

A matching input data unit is a data unit that is related to a certain file, is included in a write request and is identical to a corresponding stored data unit of the certain file. A matching input data unit may not be rewritten to the storage system. The storage system may discard the reception of the matching input data unit and not reflect its reception in any storage system management data structure.

For example the reception of a matching input data unit is not written to a journal file, not marked as being received for incremental backup or for snapshot mechanism or for any other incremental or cyclic process.

A non-matching input data unit is a data unit that is related to a certain file, is included in a write request and differs from a corresponding stored data unit of the certain file. A non-matching input data unit is written to the storage system. The storage system reflects its reception in one or more storage system management data structure.

Write requests that include at least some amount of matching input data units will be referred to hereinafter as disobedient write requests.

The storage system monitors file systems that receive disobedient write requests, for example by counting the number of disobedient write requests received per each file system. The system defines a file system as a disobedient file system if the number of disobedient write requests exceeds a certain threshold. Any other statistics may be obtained—such as a number of disobedient write requests per period of time, an increment or decrement in the rate of reception of disobedient write requests, a ratio between matching and non-matching input data units and the like.

The following treatments can be applied to disobedient file systems:

Reporting the disobedient file systems to a storage administrator or the application owner, so as to fix the issue.

Increase the priority of the file system in the cache, so as to increase the chances that its files will be found in the cache, when a comparison is required.

FIG. 1 illustrates file 110 that is stored in a storage system and belongs to file system 140 according to an embodiment of the invention. The current version of file 110 includes five stored data units data1-data5 111-115.

File system 140 may include other files not shown and may also include an Inode table (not shown) with an entry per each inode, such as inode 120 that describes properties of file 110.

Among various properties, inode 120 includes for each offset within file 110, an offset description, illustrated as offset1-offset5 121-125. Each offset description corresponds to a stored data unit and represents an offset of the data unit within the file.

Referring back to FIG. 1, offset1 121 represents offset zero within the file (file's start), where data1 111 resides. Suppose the data units are of an equal size of value S, then offset2 122 represents an offset of a value S–1 that stores data2 112, etc.

Each offset description in the inode further includes the address (not shown) within the volume (LBA, logical block address) or a physical address within a disk drive where the data unit is stored. Though data1-data5 of file 110 are illustrated as if they are contiguous, the LBAs (or any other volume/disk addresses) that corresponds to offsets1-5 are not necessarily contiguous. Accordingly, inode 120 stores a mapping between the offset of a stored data unit and a storage system address that may be a virtual address or a physical address.

FIG. 1 also illustrates a write request 130 that is addressed to file 110 of file system 140. Since the example of write request 130 includes data of a total size that is similar (or even equal) to the size of file 110 (five data units are in the file and five input data units are also in the request), the storage system will treat the write request as a potential disobedient request, i.e., a request that may not include solely changed data.

The storage system reads the data of file 110 to a cache memory of the storage system (or read data from one offset after another) and compare the data associated with each offset indicated in write request 130 to the data stored in the corresponding offset of file 110.

Write request 130 indicates offset1 151 as allegedly associated with new data. However, the allegedly new data associated with offset1 151 is input data unit data1 161, which is identical to stored data unit data1 111 that is stored in offset1 121 of file 110. In the same manner, offset2 152 and offset4 154 are associated respectively with input data unit data2 162 and input data data4 164, which are identical to stored data unit data2 112 and stored data unit data4 114—that are stored in the respective offsets (offset2 122 and offset4 124). Offset3 153 is associated with a non-matching input data unit, data3' 163, which is different from the stored data unit that is stored in offset3 123 of the file, i.e., data3 113. Therefore, this change is executed.

Offset6 155 in the write request is an offset that was never written to. This can be determined by the fact that offset6 is larger than the size of the file or by scanning the inode and failing to find offset6. It is noted that if all the offsets indicated in the write request are beyond the larger offset of the file or are not found in the inode, the comparing of the file can be skipped and the entire update is executed.

In this example, only offset3 and offset6 are considered as changed offsets (related to non-matching input data units) and the rest of the offsets indicated in the request are ignored (they are related to matching input data units).

Treating the offsets as changed offsets may include, in addition to writing the corresponding data to the file, for example, one of the following: (i) writing to a journal file the update operation as including only the changed offsets (e.g., offset3 and offset6) and excluding offsets indicated in the write request that have not been changed; (ii) Marking as differences only the changed offsets (to be used by difference-driven processes, e.g. for subsequent snapshot, asynchronous mirroring, incremental processes). Offsets requested to be written with unchanged data are not marked as differences and not treated by any subsequent difference-driven process.

Referring to FIG. 1—the storage system treats the write request as including only data3' 163 and data6 165—as if the storage system received only new write request 170 that included only non-matching input data units.

It is noted that write requests received from a client may have a different format from the format illustrated for write request 130. The request coming from the client may include contiguous data for contiguous offsets within the file and not separate into data units. For example, the write request may indicate offset zero as the target for writing, associated with a buffer of data of a size of four data units and then indicate another offset (offset6 155), associated with a buffer of data of a size of one data unit. The storage system can then parse the request and split the data into separate data units as in write request 130, for facilitating the comparison. The data units may correspond to data blocks employed by the file system.

Each file system managed by the storage system is associated with a disobedient grade, which may be determined, for example, by using a disobedient counter counting of the number of disobedient write requests directed to the file system. In the aforementioned example of write request 130, the disobedient counter is incremented by one. If the disobedient counter exceeds a disobedient threshold within a predefined time window, the file system is defined as a disobedient file system.

The storage system may notify a system administrator about disobedient file systems. The storage system may also increase the caching priority for a disobedient file system, so as to facilitate the comparing of their files when future write requests are received. If, for example, file system 140 is defined as a disobedient file system, once file 110 has been read into the cache memory, for the comparison process described above, the data of file 110 will remain in the cache memory longer than data of files from other (obedient) file systems. For example, when the cache mechanism needs to discard old data from the cache so as to free space for new data to be cached, it will prefer discarding data of other file systems over the data of file 110 of file system 140, even if the data of file 110 is cached longer than the discarded data. So that in the next write request directed to file 110, there is no need to read file 110 from the disk drive to the cache.

Figure 2:
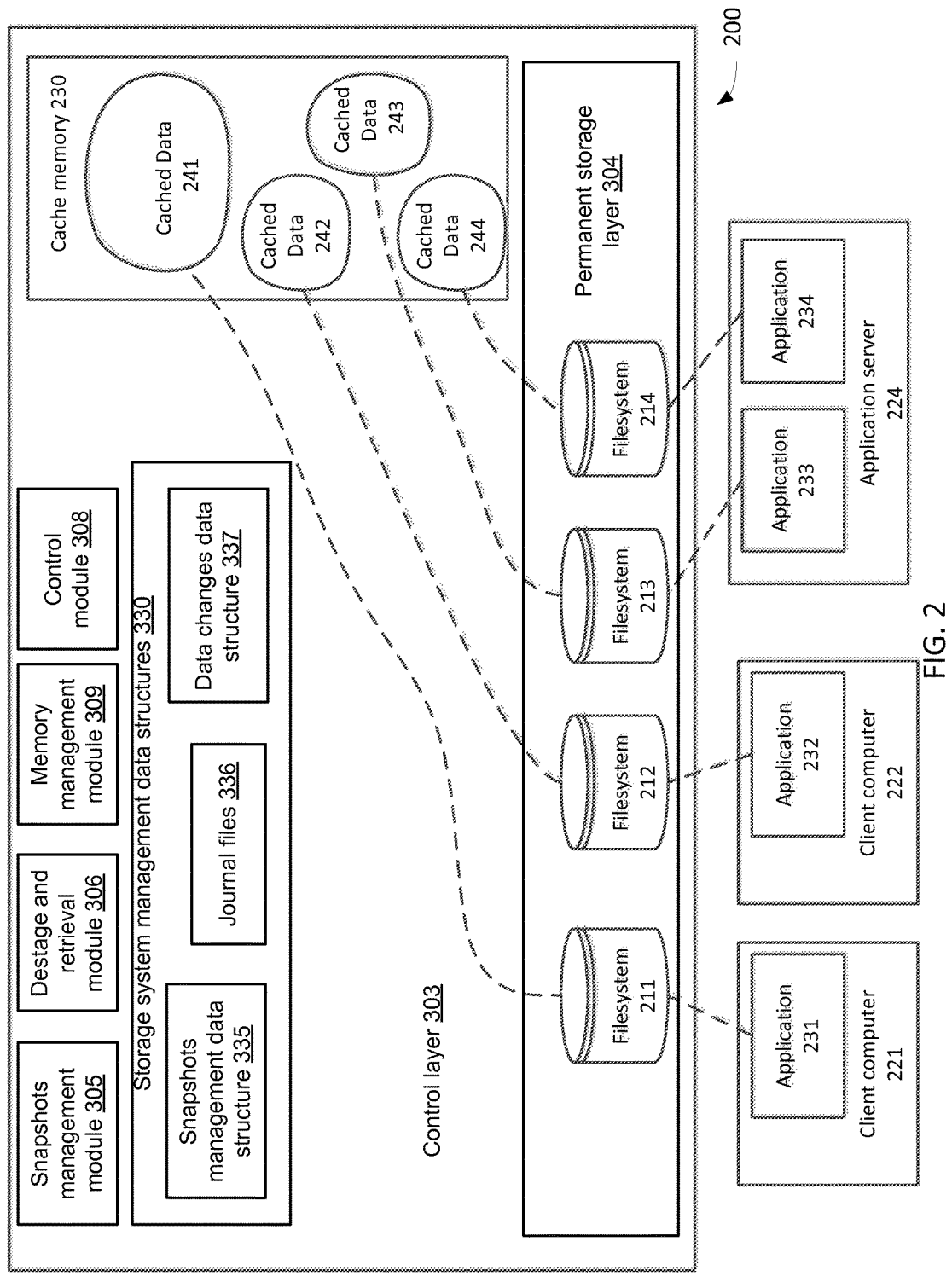
FIG. 2 illustrates a storage system and its environment according to an embodiment of the invention.

FIG. 2 illustrates a NAS storage system 200 according to an embodiment of the invention.

NAS storage system 200 manages multiple file systems, 211-214. In this example, each file system is illustrated as residing on a dedicated volume, but this is not necessarily so.

FIG. 2 illustrates three computers that are coupled to the storage system, such as client computers 221, 222 and an application server 224. The coupled computers include applications 231-234 that read and write data from/to file systems 211-214, respectively. Each application may be executed on a different client computer or multiple/all applications may be executed on the same computer, such as application server 224.

NAS storage system 200 includes cache memory 230 that stores cached data with preference to data of disobedient file systems. In this example, file system 211 is a disobedient file system and the amount of cached data 241 of file system 211 is larger and may be older than cached data 242, 243 and 244 of file systems 212-214.

NAS storage system 200 may store petabytes of data and even more.

NAS storage system 200 includes a control layer 303 and a permanent storage layer 304.

The permanent storage layer 304 is illustrated as including multiple disk drives that store file systems 211, 212, 213 and 214. It is noted that the permanent storage layer 304 may include any type and/or arrangement of non-volatile memory modules. It is noted that multiple file systems may be stored in a single disk drive. Additionally or alternatively, a single file system may be stored in multiple disk drives.

The permanent storage layer 304 may support a physical storage space optionally distributed over one or more disk drives. The physical storage space may be mapped to one or more logical memory spaces. The one or more logical memory spaces may belong to one or more layers and/or one or more volumes. Each logical memory space may include one or more logical units such as logical volumes.

The control layer 303 may include one or more appropriate storage control devices operatively coupled to the plurality of computers 221, 222 and 224 and operable to control access operations between the plurality of host computers and the permanent storage layer 304. The storage control devices may be servers, computers and/or processors.

FIG. 2 illustrates the control layer 303 as including a snapshot management module 305, destage and retrieval module 306, cache memory 230, control module 308, a memory management module 309 and storage system management data structures 330. Any module may include hardware such as a processor.

Figure 3:
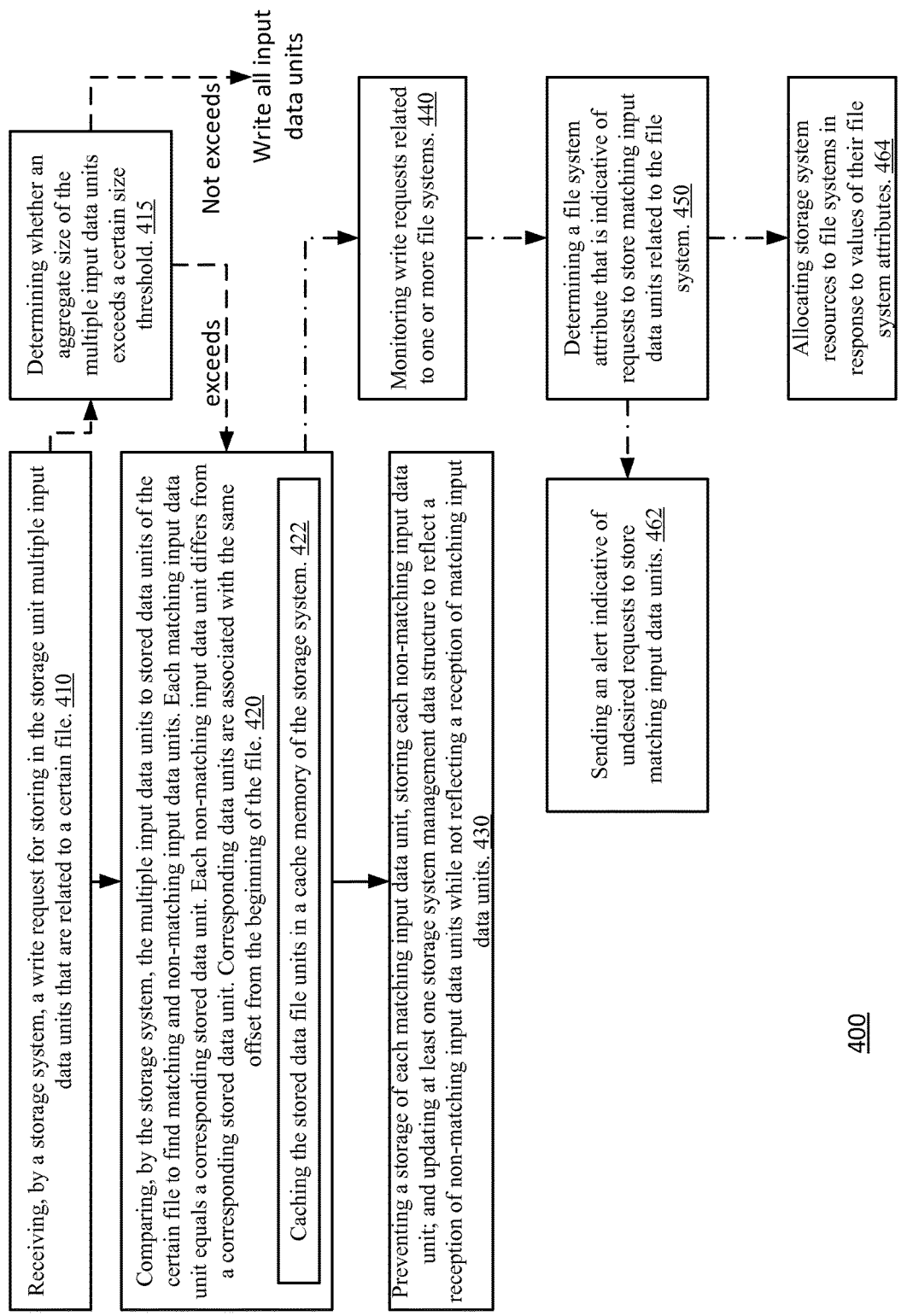
FIG. 3 illustrates a method according to an embodiment of the invention.
Figure 4:
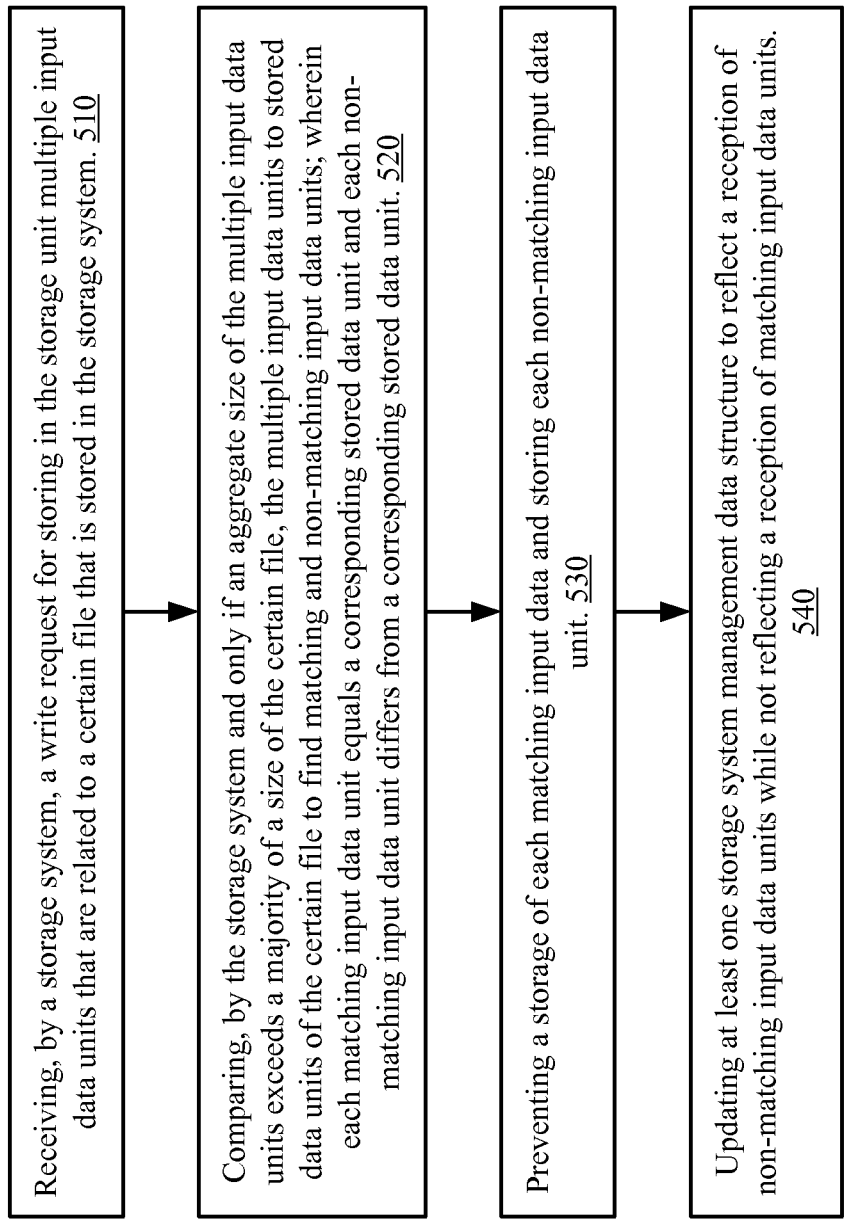
FIG. 4 illustrates a method according to an embodiment of the invention.

Any one or modules 305, 306 and 309 can be a storage control device that may be arranged to execute any one of methods 400 and 500 of FIGS. 3 and 4 and/or may participate in the execution of any one of methods 400 and 500. It is assumed, for simplicity of explanation alone, that control module 308 is arranged to execute (alone or in coordination with other modules) methods 400 and 500.

The snapshot management module 305 is arranged to manage snapshots of logical units. The snapshot management module 305 may generate snapshots metadata for retrieving snapshots.

The destage and retrieval module 306 is arranged to manage (a) the destaging of information (including but not limited to snapshots blocks) from a cache memory 230 to the permanent storage layer 304 and (b) a retrieval of the destaged information (including but not limited to stored data units of file systems) from the permanent storage layer 304.

The cache memory 230 may store information received from the computers 221, 222 and 224 before the information is destaged to the permanent storage layer 304. The cache memory 230 may also store information that was retrieved from the permanent storage layer 304. The retrieved information stored in cache memory 230 may then be processed and/or sent to computers 221, 222 and 224. FIG. 2 illustrates that cache memory 230 may store cached data 241, 242, 243 and 244 for file systems 211, 212, 213 and 214 respectively. The caching allows comparing between input data units and stored data units.

The memory management module 309 may manage the storing of information in the cache memory 230 and/or the retrieval of information from the cache memory 230.

FIG. 2 also shows storage system management data structures 330 such as snapshot management data structure 335, journal files 336 and data changes data structure 337 indicative of changes in data stored in the storage system.

These data structures can be used for managing the storage system, snapshot creation and control, tracking after file system operations and the like. It is noted that at least part of these data structures may be cached in cache memory 230, may be stored in the permanent storage layer 304 and/or in the control layer 303.

FIG. 3 illustrates method 400 according to an embodiment of the invention.

Method 400 may start by stage 410 of receiving, by a storage system, a write request for storing in the storage system multiple input data units that are related to a certain file that belongs to a certain file system.

Stage 410 may be followed by stage 420 of comparing, by the storage system, the multiple input data units to stored data units of the certain file to find matching and non-matching input data units. Each matching input data unit equals a corresponding stored data unit. Each non-matching input data unit differs from a corresponding stored data unit. Corresponding data units are associated with the same offset from the beginning of the file.

Stage 420 may be executed by control module 308. Control module 308 may, for example, request memory management module 309 to cache the stored data file in cache memory 230 in order to perform the comparison of stage 420.

Stage 420 may include stage 422 of caching the stored data file units in a cache memory of the storage system.

Stage 420 may be followed by stage 430 of preventing a storage of each matching input data unit, storing each non-matching input data unit; and updating at least one storage system management data structure to reflect a reception of non-matching input data units while not reflecting a reception of matching input data units.

Stage 430 may be executed by control module 308. The control module 308 may, for example, instruct to update at least one storage system management data structure out of data structures 335, 336 and 337 to reflect the reception of only non-matching data units and ignore the reception of matching data units.

The at least one storage system management data structure may include a journal file, a snapshot management data structure, and the like.

According to an embodiment of the invention stage 410 may be followed by stage 415 of determining whether an aggregate size of the multiple input data units exceeds a certain size threshold.

The certain size threshold may be determined based upon an aggregate size of the stored data units of the certain file. The certain size threshold may exceed a half of an aggregate size of the stored data units of the certain file.

Stage 415 may be followed by stage 420 only if the aggregate size of the multiple data units exceeds the certain size threshold. Else—no comparison is made and the write request is fulfilled even if it involves rewriting data units.

According to an embodiment of the invention method 400 further includes stage 440 of monitoring write requests related to one or more file systems. Stage 440 may follow stage 420.

Stage 440 may be followed by stage 450 of determining a file system attribute that is indicative of requests to store matching input data units related to the file system. The file system attribute may be a disobedience attribute.

Stage 450 may be followed by stage 462 of sending an alert indicative of undesired requests to store matching input data units in a certain file system.

Stage 450 may be followed by stage 464 of allocating storage system resources to file systems in response to values of their file system attributes.

Stage 464 may include allocating cache memory resources to different file systems in response to values of file system attributes.

Stage 464 may include prioritizing caching of stored data units related to first file system over caching of stored data units related to second file systems when the first file system is associated with more requests to store matching input data units than the second file system. This may include preferring a deletion, from the cache, of stored data units that are associated with the second file system.

FIG. 4 illustrates method 500 according to an embodiment of the invention.

Method 500 may start by stage 510 of receiving, by a storage system, a write request for storing in the storage system multiple input data units that are related to a certain file that is stored in the storage system.

Stage 510 may be followed by stage 520 of comparing, by the storage system and only if an aggregate size of the multiple input data units exceeds a majority of a size of the certain file, the multiple input data units to stored data units of the certain file to find matching and non-matching input data units; wherein each matching input data unit equals a corresponding stored data unit and each non-matching input data unit differs from a corresponding stored data unit.

Stage 520 may be followed by stage 530 of preventing a storage of each matching input data; and storing each non-matching input data unit.

Stage 530 may be followed by stage 540 of updating at least one storage system management data structure to reflect a reception of non-matching input data units while not reflecting a reception of matching input data units.

Method 500 may further include stages 440, 450, 462 and 464.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method, comprising:
   receiving, by a storage system from an application running on a host computer coupled to the storage system, a write request that comprises multiple input data units to be stored in the storage system in relation to a certain file that belongs to a certain file system;
   comparing, by the storage system, the multiple input data units to stored data units of the certain file to find matching and non-matching input data units among the multiple data units; wherein each matching input data unit equals a corresponding stored data unit and each non-matching input data unit differs from a corresponding stored data unit;
   preventing overwriting stored data units related to the matching input data units;
   storing each non-matching input data unit;
   updating at least one storage system management data structure to reflect a reception of non-matching input data units while not reflecting a reception of matching input data units;
   monitoring write requests related to the certain file system;
   determining that the certain file system exceeded a certain threshold of write requests to store matching input data units; and
   sending an alert indicative of undesired requests, related to the certain file system, to store matching input data units.

2. The method according to claim 1 further comprising determining whether an aggregate size of the multiple input data units exceeds a certain size threshold; and
   wherein the comparing is executed only when the aggregate size of the multiple data units exceeds the certain size threshold.

3. The method according to claim 2 wherein the certain size threshold is determined based upon an aggregate size of the stored data units of the certain file.

4. The method according to claim 2 wherein the certain size threshold exceeds a half of an aggregate size of the stored data units of the certain file.

5. The method according to claim 1 comprising allocating storage system resources to the certain file system in response to a value indicative of a number of write requests to store matching input data units, associated with the certain file system.

6. The method according to claim 1 comprising allocating storage system resources to different file systems in response to values indicative of numbers of write requests to store matching input data units associated with the different file systems.

7. The method according to claim 6 wherein the comparing comprises caching the stored data file units in a cache memory of the storage system.

8. The method according to claim 7 comprising allocating cache memory resources to different file systems in response to the values indicative of numbers of write requests to store matching input data units of the different file systems.

9. The method according to claim 1 comprising prioritizing caching of stored data units related to a first file system over caching of stored data units related to a second file system when the first file system is associated with more requests to store matching input data units than the second file system.

10. The method according to claim 9 wherein the prioritizing comprises preferring a deletion, from the cache, of stored data units that are associated with the second file system.

11. The method according to claim 1 wherein the at least one storage system management data structure comprises a journal file.

12. The method according to claim 1 wherein the at least one storage system management data structure comprises a snapshot management data structure.

13. The method according to claim 1 wherein the at least one storage system management data structure comprises data changes data structure indicative of changes in data stored in the storage system.

14. A method comprising:
    receiving, by a storage system from an application running on a host computer coupled to the storage system, a write request that comprises multiple input data units to be stored in the storage system in relation to a certain file that belongs to a certain file system and stored in the storage system;
    comparing, by the storage system and only if an aggregate size of the multiple input data units exceeds a majority of a size of the certain file, the multiple input data units to stored data units of the certain file to find matching and non-matching input data units among the multiple data units; wherein each matching input data unit equals a corresponding stored data unit and each non-matching input data unit differs from a corresponding stored data unit;
    preventing overwriting stored data units related to the matching input data units;
    storing each non-matching input data unit;
    monitoring write requests related to the certain file system;
    determining that the certain file system exceeded a certain threshold of write requests to store matching input data units; and
    sending an alert indicative of undesired requests, related to the certain file system, to store matching input data units.

15. The method according to claim 14 further comprising updating at least one storage system management data structure to reflect a reception of non-matching input data units while not reflecting a reception of matching input data units.

16. A non-transitory computer readable medium that stores instructions to be executed by a computerized system for receiving, by a storage system from an application running on a host computer coupled to the storage system, a write request that comprises multiple input data units to be stored in the storage system in relation to a certain file that belongs to a certain file system; comparing, by the storage system, the multiple input data units to stored data units of the certain file to find matching and non-matching input data units among the multiple data units; wherein each matching input data unit equals a corresponding stored data unit and each non-matching input data unit differs from a corresponding stored data unit; preventing overwriting stored data units related to the matching input data units; storing each non-matching input data unit; updating at least one storage system management data structure to reflect a reception of non-matching input data units while not reflecting a reception of matching input data units; monitoring write requests related to the certain file system; determining that the certain file system exceeded a certain threshold of write requests to store matching in nut data units; and sending an alert indicative of undesired requests, related to the certain file system, to store matching input data units.

17. A non-transitory computer readable medium that stores instructions to be executed by a computerized system for receiving, by a storage system from an application running on a host computer coupled to the storage system, a write request that comprises multiple input data units to be stored in the storage system in relation to a certain file that belongs to a certain file system and stored in the storage system; comparing, by the storage system and only if an aggregate size of the multiple input data units exceeds a majority of a size of the certain file, the multiple input data units to stored data units of the certain file to find matching and non-matching input data units among the multiple data units; wherein each matching input data unit equals a corresponding stored data unit and each nonmatching input data unit differs from a corresponding stored data unit; preventing overwriting stored data units related to the matching input data units;

storing each non-matching input data unit; monitoring write requests related to the certain file system; determining that the certain file system exceeded a certain threshold of write requests to store matching input data units; and sending an alert indicative of undesired requests, related to the certain file system, to store matching input data units.

18. A storage system comprising a cache memory and a control module, wherein the storage system is configured to store at least one storage system management data structure; wherein the control module is configured to receive, from an application running on a host computer coupled to the storage system, a write request that comprises multiple input data units to be stored in the storage system in relation to a certain file that belongs to a certain file system; compare the multiple input data units to stored data units of the certain file to find matching and non-matching input data units among the multiple data units; wherein each matching input data unit equals a corresponding stored data unit and each non-matching input data unit differs from a corresponding stored data unit; prevent overwriting stored data units related to the matching input data units; instruct a storage in the storage system of each non-matching input data unit; update the at least one storage system management data structure to reflect a reception of non-matching input data units while not reflecting a reception of matching input data units; monitor write requests related to the certain file system; determine that the certain file system exceeded a certain threshold of write requests to store matching input data units: and send an alert indicative of undesired requests, related to the certain file system, to store matching input data units.

19. A storage system comprising a cache memory and a control module, wherein the control module is configured to receive, from an application running on a host computer coupled to the storage system, a write request that comprises multiple input data units to be stored in the storage system in relation to a certain file that belongs to a certain file system and stored in the storage system; compare, only if an aggregate size of the multiple input data units exceeds a majority of a size of the certain file, the multiple input data units to stored data units of the certain file to find matching and non-matching input data units among the multiple data units; wherein each matching input data unit equals a corresponding stored data unit and each non-matching input data unit differs from a corresponding stored data unit; prevent overwriting stored data units related to the matching input data units; instruct a storing of each non-matching input data unit in the storage system; monitor write requests related to the certain file system; determine that the certain file system exceeded a certain threshold of write requests to store matching input data units; and send an alert indicative of undesired requests, related to the certain file system, to store matching input data units.

* * * * *